United States Patent [19]

Smith, Jr. et al.

[11] 4,134,011
[45] Jan. 9, 1979

[54] EARTH FORMATION POROSITY LOG USING MEASUREMENT OF FAST NEUTRON ENERGY SPECTRUM

[75] Inventors: Harry D. Smith, Jr., Houston; Michael P. Smith, Bellaire; Ward E. Schultz, Houston, all of Tex.

[73] Assignee: Texaco Inc., New York, N.Y.

[21] Appl. No.: 789,058

[22] Filed: Apr. 20, 1977

[51] Int. Cl.² .............................................. G01V 5/00
[52] U.S. Cl. .................................... 250/264; 250/265; 250/269
[58] Field of Search ............... 250/264, 265, 266, 269, 250/270

[56] References Cited

U.S. PATENT DOCUMENTS

| | | | |
|---|---|---|---|
| 3,080,478 | 3/1963 | Scherbatskoy | 250/269 |
| 3,240,938 | 3/1966 | Hall | 250/270 |
| 3,774,033 | 11/1973 | Scott et al. | 250/266 |
| 3,869,608 | 3/1975 | Scherbatskoy | 250/270 |

OTHER PUBLICATIONS

Brooks, F. D., "A Scintillation Counter with Neutron and Gamma-Ray Discriminators." (United Kingdom Atomic Energy Authority, Harwell, Berks, Eng.), *Nuclear Instr. & Methods* 4, 151-163, (1959) Apr.

*Primary Examiner*—Alfred E. Smith
*Assistant Examiner*—Janice A. Howell
*Attorney, Agent, or Firm*—Carl G. Ries; Thomas H. Whaley; William J. Beard

[57] ABSTRACT

An improved measurement of earth formation porosity is provided by the present invention using measurements of the energy spectrum of fast neutrons. A continuous source of fast neutrons is used to irradiate earth formations penetrated by a well borehole. Two neutron detectors, a fast neutron detector sensitive in the high energy range of the fast neutron energy spectrum, and an epithermal neutron detector, sensitive in the lower energy range of fast neutrons, are spaced at the same effective distance from the neutron source. Measurements of the neutron population at each detector are combined according to predetermined relationships to derive a measurement of earth formation porosity.

17 Claims, 5 Drawing Figures

EARTH FORMATION POROSITY LOG USING MEASUREMENT OF FAST NEUTRON ENERGY SPECTRUM

BACKGROUND OF THE INVENTION

This invention relates to radiological well logging methods and apparatus for investigating the characteristics of subsurface earth formations traversed by a borehole, and more particularly, to methods and apparatus for measuring the porosity of earth formations in the vicinity of a well borehole by means of neutron well logging techniques.

In the search for hydrocarbons beneath the earth's crust one of the parameters which must be known about an earth formation before evaluating its commercial potential is the fractional volume of fluid filled pore space, or porosity, present around the rock grains comprising the earth formation. Several techniques have been developed in the prior art to measure earth formation porosity in a borehole environment. One such technique employs a gamma ray source and a single, or multiple, detectors to measure the electron density of the earth formations by gamma ray scattering. This leads to an inferential measurement of the porosity of the formations. Another technique employs an acoustic transmitter and one or more acoustic receivers. The velocity of sound transmission through the formation from the acoustic transmitter to the receivers is then measured and this quantity can be related to the porosity since sound travels faster in less porous rocks than in fluid filled pore spaces in the earth formations.

A third commercial technique which has been employed in the prior art to measure the porosity of earth formations employs a neutron source and either a neutron or gamma ray detector sensitive to low energy, or thermalized, neutron density. Hydrogen is the principal agent responsible for slowing down neutrons emitted into an earth formation. Therefore, in a formation containing a larger amount of hydrogen than is present in low porosity formations the neutron distribution is more rapidly slowed down and is contained in the area of the formation near the source. Hence, the counting rates in remote thermal neutron sensitive detectors located several inches or more from the source will be suppressed. In lower porosity formations which contain little hydrogen, the source neutrons are able to penetrate farther. Hence, the counting rates in the detector or detectors are increased. This behavior may be directly quantified into a measurement of the porosity via well established procedures.

All of these commercially employed methods have generally not proven to be as accurate as desirable due to diameter irregularities of the borehole wall, variation of the properties of different borehole fluids, the irregular cement annulus surrounding the casing in a cased well borehole, and the properties of different types of steel casings and formation lithologies which surround the borehole. For example, the thermal neutron distribution surrounding a source and detector pair sonde as proposed in the prior art can be affected by the chlorine content of the borehole fluid. Similarly, lithological properties of the earth formations in the vicinity of the borehole, such as the boron content of these formations, can affect the measurement of thermal neutron populations. The present invention however, rather than relying on a measurement of the thermal neutron population comprises a neutron measurement of the formation porosity which utilizes a measure of the epithermal neutron population at one detector and the fast neutron population at a second detector spaced approximately the same distance from a neutron source. Special detectors and other means are utilized in the present invention to effectively discriminate against the detection of thermal neutrons or their resultant capture gamma rays as proposed by prior art thermal neutron population measurement techniques.

Thus, it is an object of the present invention to provide an improved method and apparatus for measuring the porosity of earth formations in situ in a well borehole.

Another object of the present invention is to provide a new technique for measuring the porosity of earth formations in the vicinity of a well borehole by combining measurements of the epithermal neutron population and the fast neutron population.

BRIEF DESCRIPTION OF THE INVENTION

In accordance with the present invention, a relatively high intensity continuous neutron source irradiates the earth formations surrounding a well borehole with a flux of fast neutrons. A pair of neutron detectors, one sensitive to neutrons in the epithermal energy range, and another sensitive to fast neutrons, which are effectively spaced approximately the same distance from the neutron source measure the fast and epithermal neutron populations at this effective distance. The measurements of the fast and epithermal neutron populations at the two detectors may then be interpreted in terms of the earth formation porosity in accordance with predetermined relationships. The techniques and apparatus of the present invention give improved results over prior art devices in that less sensitivity to disturbing environmental parameters results from the use of the present invention.

For a better understanding of the present invention, together with other and further objects and features thereof, together with additional advantages, reference is made to the following detailed description of the invention which is to be taken conjunction with the appended drawings in which:

DESCRIPTION OF THE PREFERRED EMBODIMENTS

Figure 1:
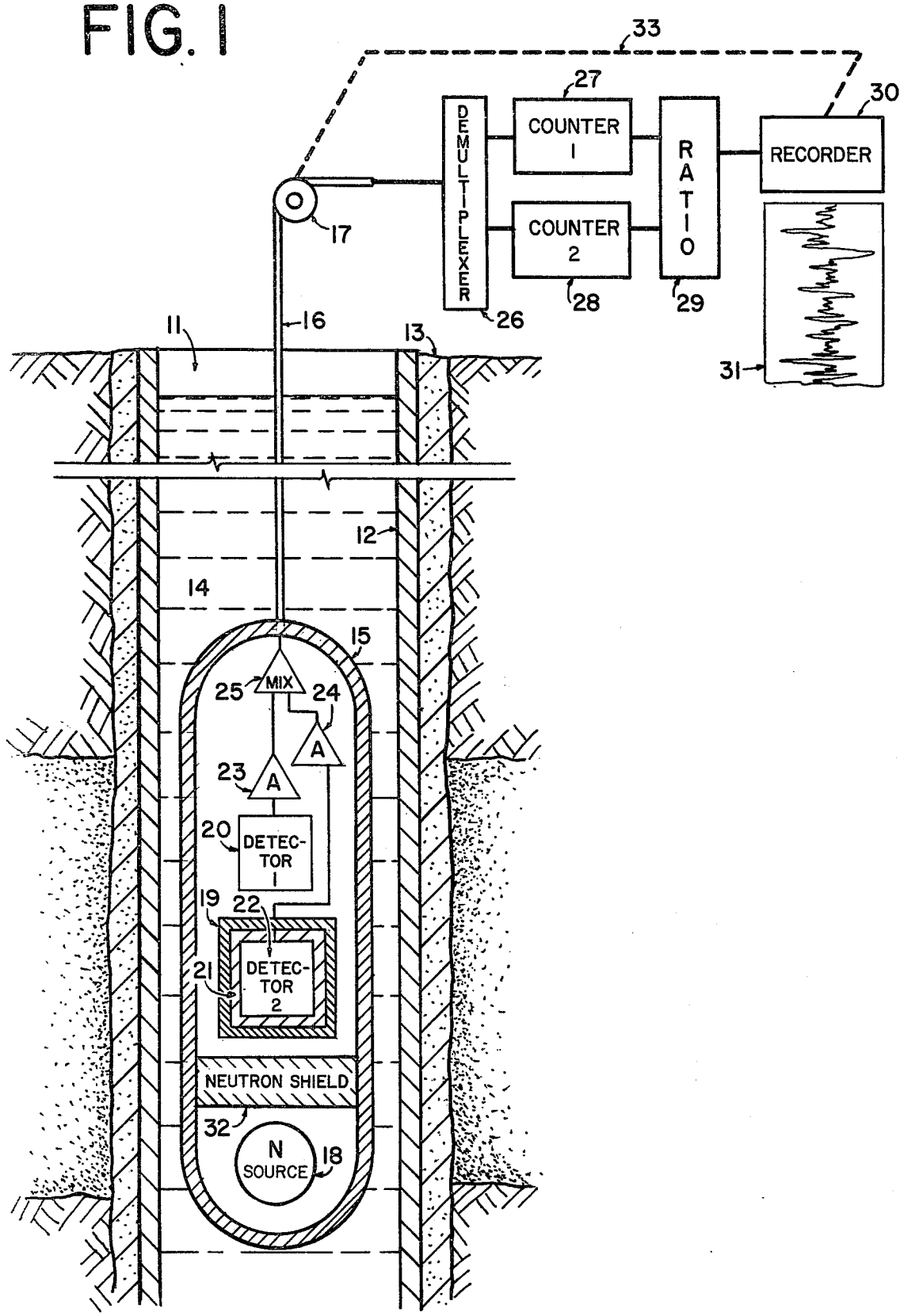
FIG. 1 is a schematic diagram showing a well logging system and according to the principles of the present invention, and having two detectors located at approximately the same distance on one side of a neutron source.

Referring initially to FIG. 1 there may be seen a simplified schematic functional representation in the form of a block diagram of a well logging apparatus in accordance with the present invention. A well borehole 11 penetrating earth formations is lined with a steel casing 12 and is filled with a well fluid 14. The steel casing 12 may be cemented in place by cement layer 13 which also serves to prevent fluid communication between adjacent producting formation in the earth.

The downhole portion of the logging system may be seen to be basically composed of an elongated fluid tight, hollow, body member or sonde 15 which, during the logging operation, is passed longitudinally through the casing 12 and is sized for passage therethrough. Surface instrumentation, whose function will be discussed in more detail subsequently, is shown for processing and recording electrical measurements provided by the sonde 15. A well logging cable 16 which passes over a sheave wheel 17 supports the sonde 15 in the borehole 11 and also provides a communication path for electrical signals to and from the surface equipment and the sonde 15. The well logging cable 16 may be of conventional armored cable design and may have one or more electrical conductors for transmitting such signals between the sonde 15 and the surface apparatus.

Again, referring to FIG. 1 the sonde 15 contains, at its lower end, a neutron source 18. This neutron source may comprise a typical continuous chemical neutron source such as an actinium-beryllium, Californium 252 or Americium beryllium which is capable of providing on the order of $10^{+8}$ neutrons per second. Alternatively a deuterium-trituim accelerator type source of the type known in the art, which produces essentially monoenergetic 14 MEV neutrons mmay be used in a continuous operation made, if desired, according to the concept of the present invention.

Radiation detectors 20 and 22 are provided in the downhole sonde 15 and or separated from the neutron source 18 by a neutron shielding material 32. The neutron shield material 32 may comprise any highly hydrogenous material which serves to effectively slow down and shield the detectors 20 and 22 from direct neutron irradiation by the neutron source 18. Any suitably highly hydrogenous material such as paraffin or hydrocarbon polymer plastics may be used for this purpose. While the detectors 20 and 22 are shown slightly separated from each other in the drawing of FIG. 1, it will be appreciated that in the present invention, the two detectors 20 and 22 should be located at approximately the same distance from the neutron source as is practicable. An alternative arrangement in which both detectors may be situated at precisely the same distance from the source which will be discussed with respect to FIG. 2.

The detector 20 of FIG. 1 is a fast neutron detector. This detector may comprise a scintillation type detector which is sensitive to the interaction of the scintillator material with fast neutrons. Such a detector could comprise, for example, a stilbene detector which is sensitive to fast neutron interactions. Such scintillation detectors may also be sensitive to high energy gamma radiation produced by the capture of neutrons from the neutron source in earth formations surrounding the well borehole. However, the pulse shape characteristics of gamma ray interactions produced by such captures may be distinguished from the pulse shape characteristics in such a detector provided by the interaction of a fast neutron with the detector material. Such a stilbene fast neutron detector is described in the publication entitled "A SCINTILLATION COUNTER WITH NEUTRON GAMMA RAY DISCRIMINATOR" BY F. D. Brooks, Published by the Atomic Energy Research Establishment, Harwell England, 1959, and having laboratory publishing number HL. 59/282 (s.c.9).

The second detector 22 contemplated for use in the present invention is an epithermal neutron detector. This detector which may comprise, for example, a pressurized $He^3$ detector is sensitive to neutrons in the epithermal energy range from approximately 0.178 electron volts to approximately 1.46 electron volts. This is contrasted to the fast neutron detector 20 which is essentially sensitive to fast neutrons having energies in the range of from roughly $0.2 \times 10^{+6}$ electrons volts to $12 \times 10^{+6}$ electron volts. Thus, the two neutron detectors 22 and 20 provide two energy bands or windows in which the neutron population energy spectrum may be observed by the downhole well logging sonde 15. The epithermal neutron detector 22 is embedded in a layer of hydrogenous material 21 and is surrounded by a relatively thin, for example 0.02 inch, layer of thermal neutron absorbing material 19 such as cadmium or the like. The $He^3$ detector 22 is thus shielded from the interaction of thermalized neutrons due to the action of the cadmium layer 19 which, having an extremely large thermal neutron capture cross-section, effectively absorbs all, or most, thermal neutrons in the vicinity of detector 22 before these neutrons can impinge upon the detector and cause any interaction with the detector 22.

In any event, the detectors 20 and 22 provide electrical pulse signals which are representative of the number of neutrons present at their location in the epithermal energy range and in the fast neutron energy range to which the detectors are senstitive. The electrical signals from the detector 20 are amplified in an amplifier 23 and supplied to a muliplexing mixing circuit 25 Similarly, the electrical pulse representations from the epithermal detector 22 are conducted to an amplifier 24 and also supplied to the mixer 25. The mixed signals are supplied via cable 16 conductors to a surface demultiplexer circuit 26. This circuit for example may discriminate against signals from the two downhole detectors on the basis of their polarity. Output signals from the demultiplexer 26 comprise pulse signals representative of the fast neutron population in the vicinity of the detector 20 and the epithermal neutron population signals present in the vicinity of detector 22. The fast neutron pulse signals are supplied to a pulse counter 27 and the epithermal neutron population signals are supplied to a second counter 28.

The counters 27 and 28 thus provide counts of the number of fast neutrons present in the vicinity of detector 20 and epithermal neutrons present in the vicinity of detector 22 in the form of digital counts. These counts may be strobed or sychronized at a predetermined rate, for example 1 per second, into a digital ratio circuit 29. The ratio circuit 29 forms the ratio of counting rates at the two detectors, for example the ratio of fast neutron population present at detector 20 to the epithermal neutron population present at detector 22. It will be appreciated by those skilled in the art that it is possible to weight the ratio to compensate for effects produced by any difference in the distance of the two detectors from the neutron source so that a ratio measurement which is normalized to detectors located at the same distance from the neutron source may be obtained. Similarly, the ratio can be corrected to normalize any differences in detector sensitivities.

It has been discovered by the applicants that this ratio signal is functionally related to the earth formation porosity of the earth formations in the vicinity of the downhole sonde. The output signal from this ratio detector is supplied to a data recorder 30 which may be of the typical strip chart or film recorder type used in well logging. The recorder 30 provides an output trace of the ratio signal on a record medium 31 as a function of borehole depth. The depth information is obtained by mechanically or electrically coupling the recorder 30 to the sheave wheel 17 as indicated by the dotted line 33 of FIG. 1 in a conventional manner as known in the art.

Figure 2:
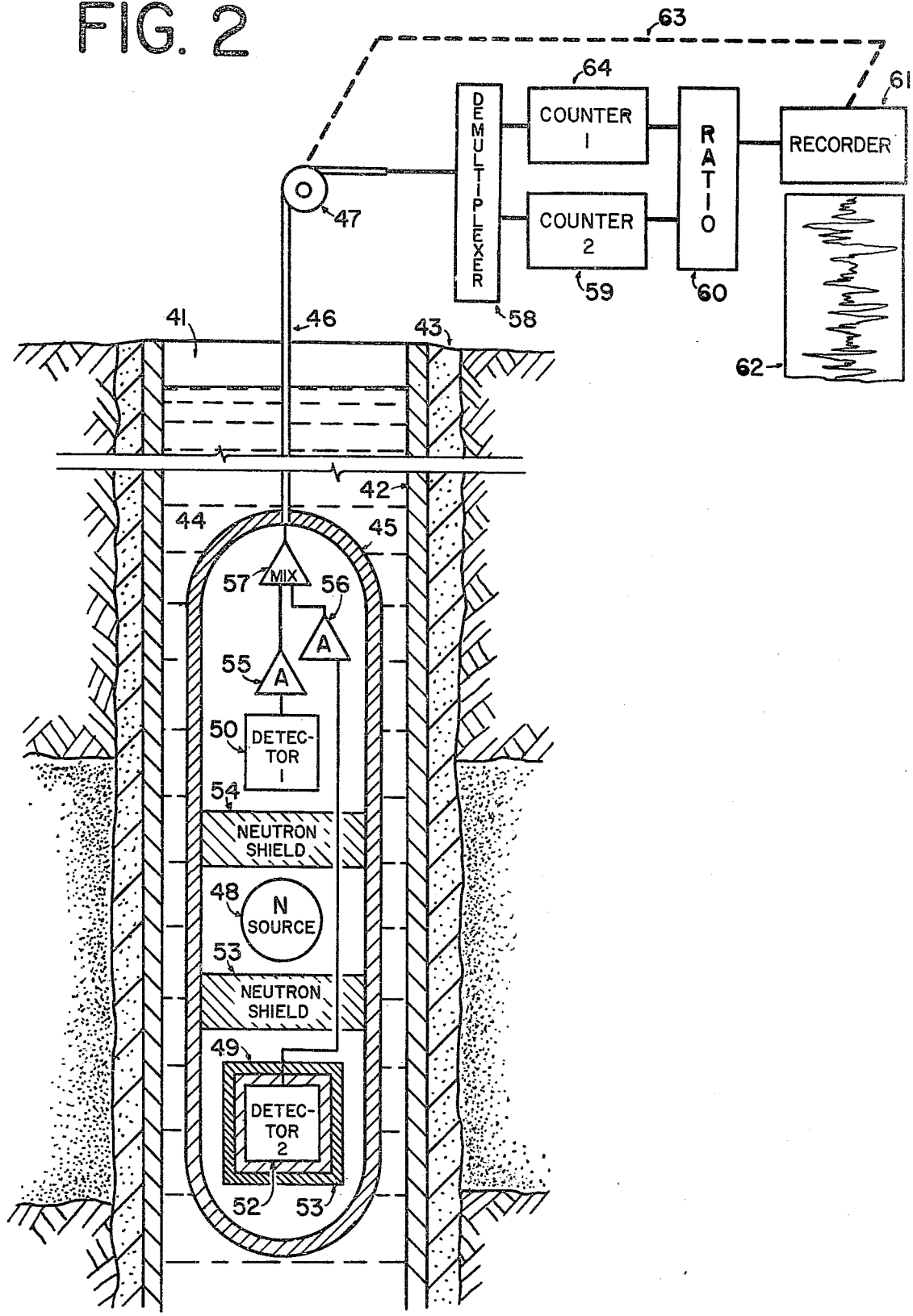
FIG. 2 is a similar system having two detectors equally spaced from a neutron source lying on opposites sides of the neutron source.

Referring, now to FIG. 2 as second embodiment of a well logging system in accordance with the concepts of the present invention is illustrated in schematic block diagram form also. In FIG. 2 a well borehole 41 is shown penetrating earth formations, lined with steel casing 42 and surrounded by a cement sheath 43. The cased well borehole 41 is filled with a well fluid 44. The downhole sonde 45 is shown suspended from a well logging cable 46 in the borehole 41, in a manner similar to that illustrated with respect to FIG. 1. In the well logging system of FIG. 2 the downhole sonde 45 is provided with a neutron source 48 which may be of the continuous chemical type similar to that described with respect to FIG. 1. The downhole sonde is also provided with two neutron detectors 50 and 52 which correspond to the detectors of FIG. 1, but which, in the instance of the system of FIG. 2, are shown located above and below the neutron source 48. The detectors 50 and 52 are spaced at the same distance from the neutron source 48. Two neutron shields 53 and 54 separate the neutron source 48 from the detectors and prevent the direct irradiation of the detectors by the neutron source, in the manner of the neutron shield in FIG. 1. The detector 52 is sensitive to epithermal neutrons and may comprise a He$^3$ pressurized detector which is surrounded by a neutron moderating hydrogenous material 51 and the outer shell of which is surrounded by a thermal neutron absorber layer 49 such as cadmium or the like in a manner similar to that discussed with respect to FIG. 1.

Similarly, the detector 50 of FIG. 2 may be a fast neutron detector comprising stilbene detector similar to that described with respect to FIG. 1. Output signals from the fast neutron detector 50 are amplified in an amplifier 55 and supplied as one input to a mixer circuit 57. Output signals from the epithermal neutron detector 52 are supplied via an amplifier 56 to the opposite input of the mixer amplifier driver circuit 57. The signals from the two detectors may be discriminated from each other by multiplexing, or on the basis of their polarity as desired, in a manner known in the art.

The electrical output signals from the mixer driver circuit 57 are conducted to the surface via well logging cable 46 and supplied to a demultiplexing circuit 58 which serves to separate the signals into that from each of the downhole detectors 50 and 52. The fast neutron representative signals are supplied to a counter 64. The epithermal neutron population signals are supplied to a counter 59. The counters 64 and 59 serve to digitally count the number of fast neutrons present at the detector 50 and epithermal neutrons present at the detector 52 and to provide output signals which may be strobed or synchronized into a digital ratio circuit 60 in the manner discussed previously. The ratio signal output from the ratio circuit 60 is supplied to a recorder 61 which again records this information as a function borehole depths on an output record medium 62. Again, the recorder 61 is electrically or mechanically coupled to the sheave wheel 47 to provide the depth information so that these signals may be recorded as a function of borehole depth.

While not shown in FIGS. 1 and 2, it will be appreciated by those skilled in the art that conventional electrical power supplies situated, for example, at the surface, supplying operating voltages for the circuit components in the downhole sondes 45 and 15 in a manner known in the art.

Figure 4:
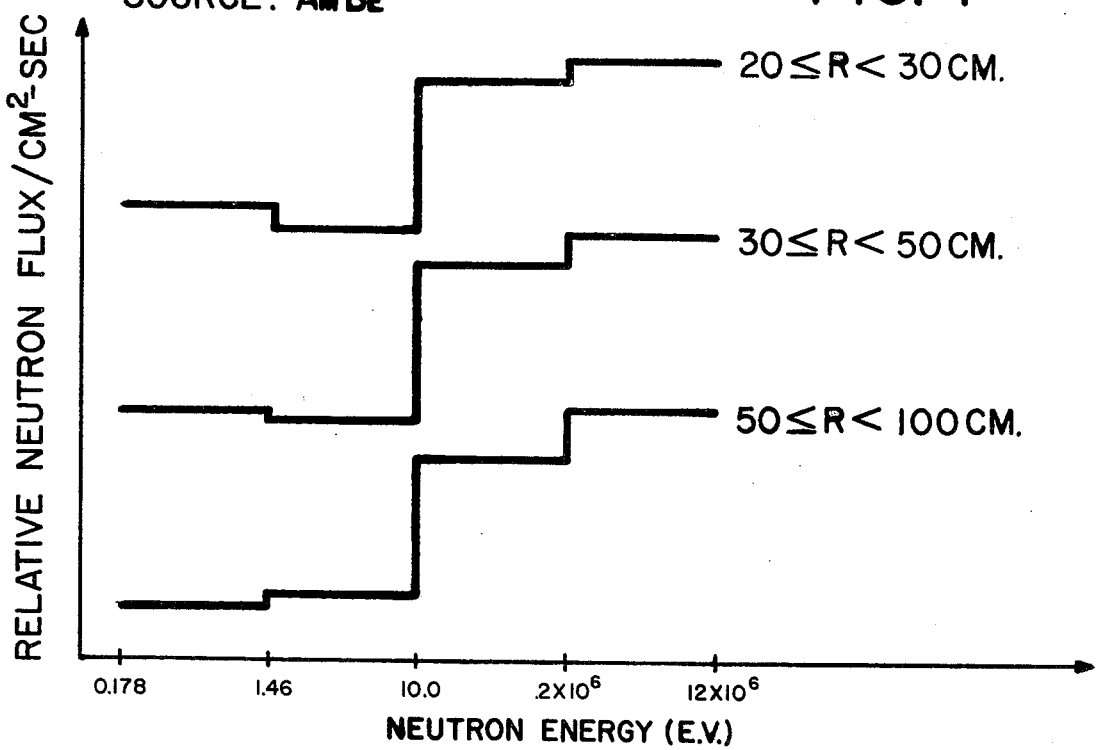
Figure 5:
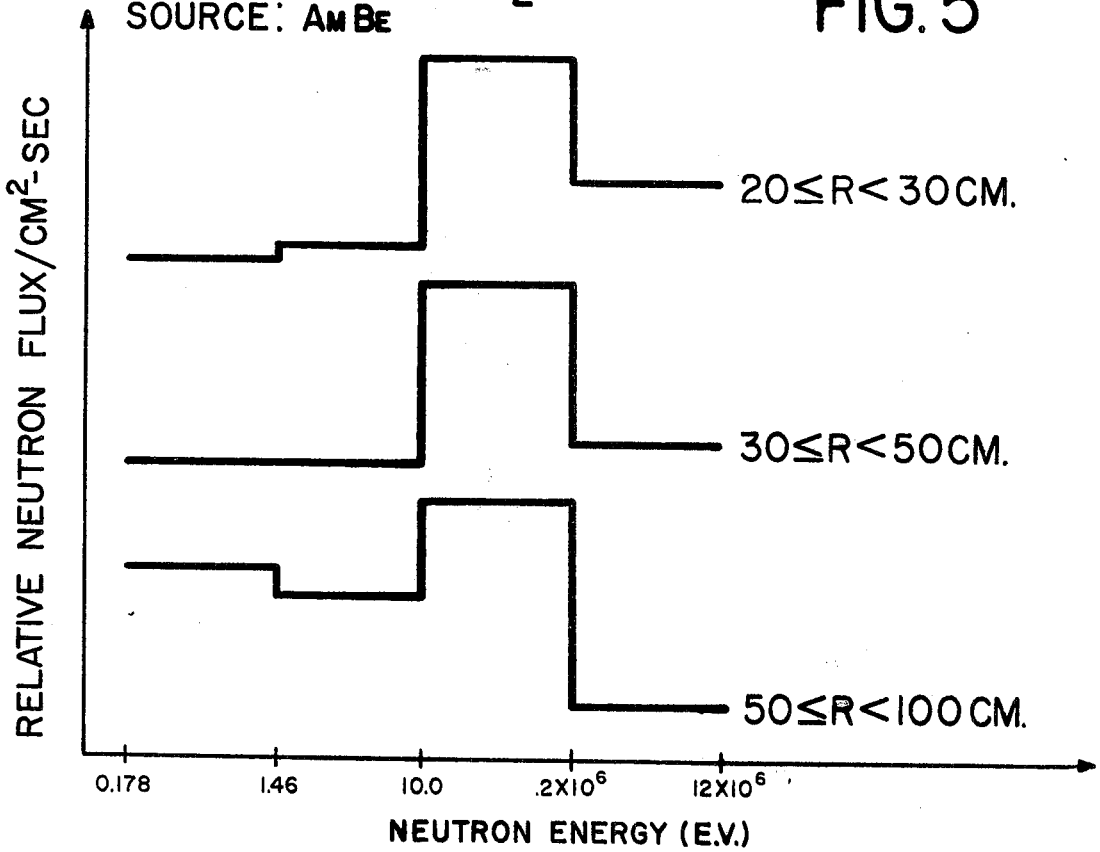

Turning now to FIGS. 4 and 5, the basis for the porosity measurement of the well logging system accordng to the present invention is illustrated. FIGS. 4 and 5 each illustrate the neutron energy spectrum as a function of distance from a neutron source. These Figures were derived according to calculations performed theoretically by a monte carlo type neutron transport computer program. The illustration of FIG. 4 shows the neutron energy spectra for a water filled sand of 36% porosity at different distances from an americium-beryililum neutron source. The illustration of FIG. 5 shows the neutron energy spectra at different distances from the same source in a water filled sand of 3% porosity. It will be observed from FIGS. 4 and 5 that the ratio of fast neutrons to epithermal energy neutrons in the energy range from $0.2 \times 10^{+6}$ to $12 \times 10^{+6}$ electron volts varies considerably as a function of porosity.

If desired, the total count rate in each of the detectors integrated over any desired energy range may also be used as a conventional porosity indicator. Similarly, if desired, an energy threshold can be set to exclude any thermal or epithermal neutron count rates which may be present in the fast neutron detector. As previously mentioned these counts may also be discriminated against on the basis of their different pulse shape characteristics in the stilbene detector.

Figure 3:
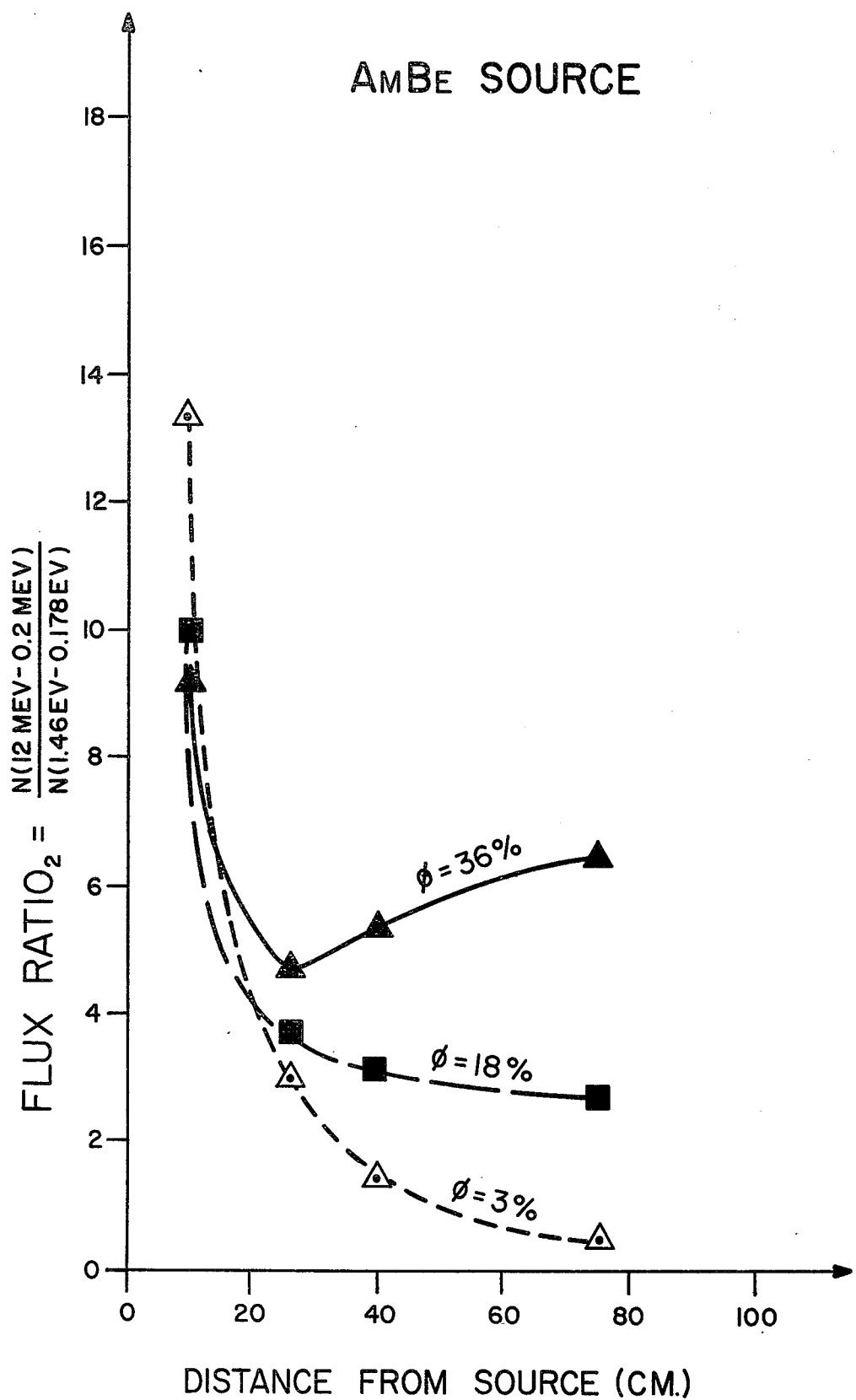
FIG. 3 is a graphical relationship illustrating the variation of the neutron flux ratio of a fast neutron detector to an epithermal neutron detector spaced approximately the same distance from a neutron source for several different porosity formations in the vicinity of a well borehole; and, FIGS. 4 and 5 illustrate the neutron energy spectrum at various distances from a neutron source in earth formations of differing porosities.

Referring, now to FIG. 3, the neutron flux ratio of fast neutrons to epithermal neutrons in the previously mentioned energy ranges plotted as a function of distance from the source is illustrated as a function of several different porosities. It will be observed from FIG. 3, that at reasonable source detector spacings of from less than 40 to more than 80 centimeters that this neutron population ratio exhibits a distinctive separation as a function of porosity. It can also be observed that in the high porosity range from 18% to 36% that, at source to detector spacings of from approximately 40 to 80 centimeters, a quite large separation is provided by the measurement of the fast neutron to epithermal neutrons population ratio. This is a vast improvement over other neutron type porosity logs such as those made using accelerator type neutron sources and detectors spaced relatively close to such sources. Such logs lose sensitivity in the higher porosity ranges, such as the range from 18-36%. Also, the present invention, by measuring only neutron populations above the thermal energy range remains less sensitive to formation lithology effects than other logs which measure neutron population in the thermal energy range. Small concentrations of boron or other strong thermal neutron absorbers do not effect the measurement of the present invention.

It is possible, by placing calibrating charts such as that of FIG. 3 in the memory of a small general purpose digital computer, to compute and record the porosity of earth formations directly as a function of depth, utilizing a well logging system in accordance with the concepts of the present invention. A small general purpose digital computer such as the Model PDP-11 which is sold by the Digital Equipment Corporation of Maynard, Mass. would be suitable for this purpose. It would also be apparent given the disclosure of the present invention present herein, for a programmer of ordinary skill to program such a small general purpose digital computer using a common compiler language such as FORTRAN and utilizing conventional mathematical interpolation procedures to perform this porosity calculation in the manner described.

The foregoing descriptions may make other alternative arrangements of the concepts of the present invention, apprent to those skilled in the art. It is therefore, the aim of the appended claims to cover all such changes and modifications as may be made within the true spirit and scope of the invention.

We claim:

1. A method for determining the porosity of earth formations in the vicinity of a cased well borehole comprising the steps of:
   irradiating earth formations in the vicinity of a cased well borehole with a continuous source of fast neutrons;
   detecting the fast neutron population at a spaced distance from said neutron source in the borehole and generating signals representative thereof;
   detecting the epithermal neutron population at a spaced distance from said neutron source in the borehole and generating signals representative thereof; and
   combining said fast and epithermal neutron population representative signals to derive a measurement signal functionally related to the porosity of earth formations in the vicinity of the borehole.

2. The method of claim 1 wherein the detection of said fast neutron population and said epithermal neutron population is performed at approximately the same distance from said neutron source in the borehole.

3. The method of claim 1 wherein the combining step is performed by forming a ratio of said fast neutron and said epithermal neutron representative signals.

4. The method of claim 3 and further including the step of calibrating said ratio signal according to a predetermined functional relationship to derive a porosity signal quantitatively representative of the porosity of earth formations in the vicinity of the borehole.

5. The method of claim 1 wherein said irradiating step is performed with a continuous chemical type neutron source.

6. The method of claim 1 wheren said irradiating step is performed with a deuterium-tritium accelerator type continuous neutron source.

7. Apparatus for determining the porosity of earth formations in the vicinity of a cased well borehole, comprising:
   a fluid tight, hollow, pressure resistant body member sized and adapted for passage through a cased well borehole and having contained therein a continuous source of fast neutrons and at least one fast neutron detector longitudinally spaced therefrom.

8. The apparatus of claim 7 wheren said fast neutron detector comprises a stilbene detector.

9. The apparatus of claim 7 wherein said fast neutron detector is longitudinally spaced from 40 and 80 centimeters from said source.

10. The apparatus of claim 7 wherein said neutron source comprises a chemical type neutron source.

11. The apparatus of claim 7 wherein said neutron source comprises a deuterium-tritium accelerator type neutron source.

12. Apparatus for determining the porosity of earth formations in the vicinity of a cased well borehole comprising:
    a fluid tight, hollow pressure resistant body member sized and adapted for passage through a cased well borehole and having contained therein a continuous source of fast neutrons, a fast neutron detector longitudinally spaced from said source and an epithermal neutron detector longitudinally spaced form said source.

13. The apparatus of claim 12 wherein said fast neutron detector comprises a stilbene scintillation detector.

14. The apparatus of claim 12 wherein each of said detectors is longitudinally spaced approximately the same distance from said neutron source.

15. The apparatus of claim 14 wherein said detectors are each spaced from 40 to 80 centimeters from said neutron source.

16. The apparatus of claim 12 wherein said neutron source comprises a chemical type continuous neutron source.

17. The apparatus of claim 12 wherein said neutron source comprises a deuterium-tritium accelerator type continuous neutron source.

* * * * *